(12) United States Patent
Kiyoshita et al.

(10) Patent No.: US 11,142,251 B2
(45) Date of Patent: Oct. 12, 2021

(54) UPPER VEHICLE-BODY STRUCTURE

(71) Applicant: Mazda Motor Corporation, Hiroshima (JP)

(72) Inventors: Daisuke Kiyoshita, Hiroshima (JP); Tadashi Yamazaki, Hiroshima (JP); Takeshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/816,284

(22) Filed: Mar. 12, 2020

(65) Prior Publication Data

US 2020/0391799 A1    Dec. 17, 2020

(30) Foreign Application Priority Data

Jun. 17, 2019   (JP) .............................. JP2019-111743

(51) Int. Cl.
  *B62D 25/02*   (2006.01)
  *B62D 25/04*   (2006.01)
  *B62D 25/06*   (2006.01)
  *B62D 27/04*   (2006.01)

(52) U.S. Cl.
  CPC ........... *B62D 25/02* (2013.01); *B62D 25/025* (2013.01); *B62D 25/04* (2013.01); *B62D 25/06* (2013.01); *B62D 27/04* (2013.01)

(58) Field of Classification Search
  CPC ........ B62D 25/02; B62D 25/04; B62D 25/06; B62D 27/02; B62D 27/023; B62D 27/026
  USPC ................... 296/203.01, 203.03, 193.06, 210
  See application file for complete search history.

(56) References Cited

U.S. PATENT DOCUMENTS

| | | | | |
|---|---|---|---|---|
| 9,452,788 | B2* | 9/2016 | Anegawa | B62D 25/06 |
| 9,545,957 | B2* | 1/2017 | Okuyama | B62D 29/001 |
| 9,815,498 | B2* | 11/2017 | Yamamoto | B62D 25/04 |
| 10,882,562 | B2* | 1/2021 | Tanaka | B62D 21/157 |

(Continued)

FOREIGN PATENT DOCUMENTS

| | | | | |
|---|---|---|---|---|
| JP | | 6022682 B2 * | 11/2016 | B62D 25/04 |
| JP | 2017-39331 A | | 2/2017 | |

*Primary Examiner* — Dennis H Pedder
(74) *Attorney, Agent, or Firm* — Xsensus LLP

(57) ABSTRACT

In an upper vehicle-body structure including: a roof side rail disposed at an upper and vehicle-width-direction outer side portion of the vehicle and including a closed cross-section extending in a vehicle front-rear direction; a pillar extending downward from an intermediate portion in the vehicle front-rear direction of the roof side rail; and a roof rail reinforcement disposed inside the intermediate portion in the vehicle front-rear direction of the roof side rail and extending in the front-rear direction, the roof rail reinforcement including front and rear ends bent toward a vehicle-width-direction outer side, the roof rail reinforcement being configured to partition a space inside the intermediate portion of the roof side rail in the vehicle front-rear direction and a vehicle width direction, the roof side rail includes a roof rail outer and a roof rail inner defining, jointly with the roof rail outer, a closed cross-section, the pillar includes a pillar outer and a pillar inner defining, jointly with the pillar outer, a closed cross-section extending in an up-down direction, and the roof rail reinforcement is at least fixed to the roof rail outer, the roof rail inner, and the pillar inner.

20 Claims, 5 Drawing Sheets

(56) References Cited

U.S. PATENT DOCUMENTS

| | | | |
|---|---|---|---|
| 2013/0049405 A1* | 2/2013 | Kurogi | B62D 25/06 296/203.01 |
| 2016/0083018 A1* | 3/2016 | Anegawa | B62D 25/04 296/193.05 |
| 2016/0332674 A1* | 11/2016 | Okuyama | B62D 29/005 |
| 2019/0276087 A1* | 9/2019 | Tanaka | B62D 21/157 |
| 2019/0382057 A1* | 12/2019 | Takayanagi | B62D 21/157 |

* cited by examiner

UPPER VEHICLE-BODY STRUCTURE

CROSS REFERENCE TO RELATED APPLICATION

The present application claims priority to JP 2019-111743, filed Jun. 17, 2019, the entire contents of which are incorporated herein by reference.

TECHNICAL FIELD

The present disclosure relates to an upper vehicle-body structure of a vehicle including a pair of left and right roof side rails and pillar parts extending downward from intermediate portions in a vehicle front-rear direction of the pair of roof side rails.

BACKGROUND

A known conventional upper vehicle-body structure of a vehicle includes: a pair of left and right roof side rails disposed at respective ends of a roof panel in a vehicle width direction and extending in a vehicle front-rear direction; and a pair of left and right center pillars extending downward in an up-down direction from respective intermediate portions in the vehicle front-rear direction of the pair of roof side rails.

To ensure safety of occupants in the event of a side collision of such a vehicle, various techniques have been proposed to restrain the pillar members from moving toward a vehicle-width-direction inner side. For example, as shown in FIG. 8, a center pillar 53 coupling a roof side rail 51 and a side sill 52 may be structured such that bending rigidity of its upper member corresponding to about two thirds from the upper end of the center pillar 53 is larger than bending rigidity of its lower member corresponding to about one third from the lower end of the center pillar 53. This can make a bending deformation angle of the lower member larger than that of the upper member, allowing to reduce the maximum displacement of the center pillar 53 toward the vehicle-width-direction inner side.

Another known example of the techniques to restrain the pillar members from moving toward the vehicle-width-direction inner side is to dispose members at a connecting portion between the roof side rail and the center pillar in such a manner that the members partition, in a joint-like manner, a closed-cross section inside the roof side rail extending in the front-rear direction to thereby enhance rigidity of the roof side rail against side collisions, as disclosed in Patent Document 1.

[Patent Document 1] JP-A-2017-039331

SUMMARY

In one aspect, an upper vehicle-body structure of a vehicle, the upper vehicle-body structure includes: a roof side rail disposed at an upper and vehicle-width-direction outer side portion of the vehicle, the roof side rail including a closed cross-section extending in a vehicle front-rear direction; a pillar extending downward from an intermediate portion in the vehicle front-rear direction of the roof side rail; and a roof rail reinforcement disposed inside the roof side rail at the intermediate portion in the vehicle front-rear direction of the roof side rail and extending in the vehicle front-rear direction, the roof rail reinforcement including front and rear ends bent toward a vehicle-width-direction outer side, the roof rail reinforcement being configured to partition a space inside the intermediate portion of the roof side rail in the vehicle front-rear direction and a vehicle width direction, the upper vehicle-body structure being characterized in that: the roof side rail includes a roof rail outer and a roof rail inner, the roof rail outer constituting a vehicle-width-direction outer side wall, the roof rail inner defining, jointly with the roof rail outer, a closed cross-section, the pillar includes a pillar outer and a pillar inner, the pillar outer constituting a vehicle-width-direction outer side wall, the pillar inner defining, jointly with the pillar outer, a closed cross-section extending in an up-down direction, and the roof rail reinforcement is at least fixed to the roof rail outer, the roof rail inner, and the pillar inner.

DETAILED DESCRIPTION

Embodiments of the present disclosure will be described below with reference to the drawings. The embodiments given below are merely exemplary in nature and are not intended to limit the present disclosure, its application, or uses.

An object of the present disclosure is to provide an upper vehicle-body structure and the like of a vehicle that can reduce displacement of the roof side rail in the event of a side collision to thereby restrain the pillar from entering into the vehicle interior.

Figure 1:
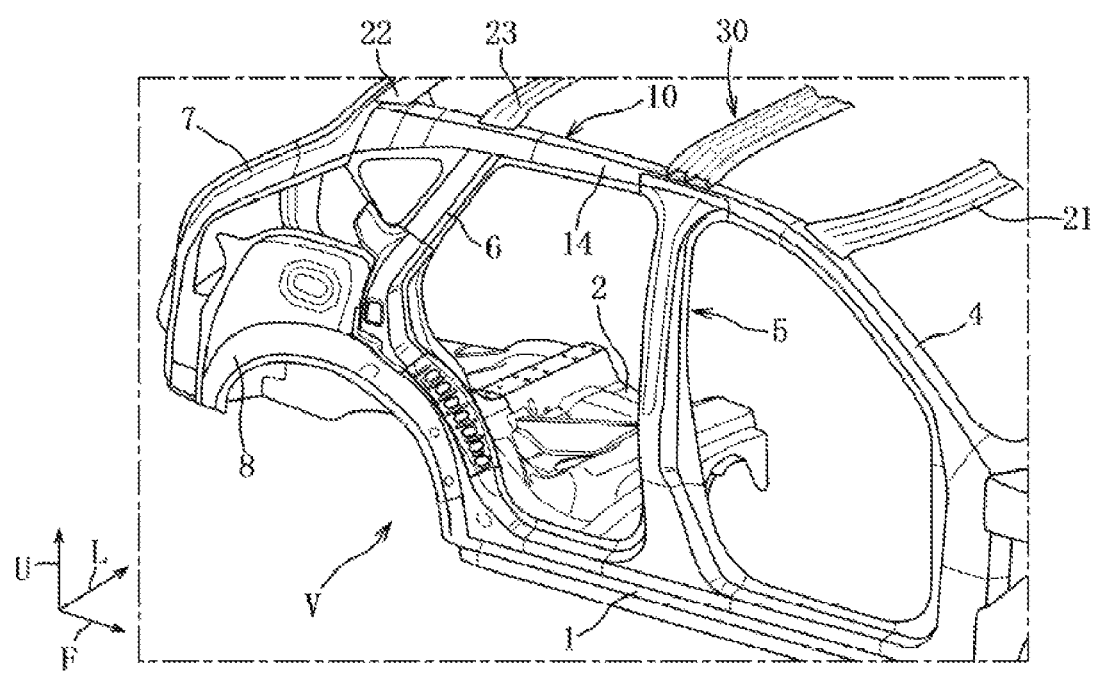
FIG. 1 is a perspective view of a vehicle-width-direction outer side of a vehicle, according to some embodiments.

FIG. 1 is a perspective view of a vehicle-width-direction outer side of a vehicle, according to some embodiments of the present disclosure. As shown in FIG. 1, a vehicle V may include an engine (not shown in the figure) vertically installed in an engine compartment at the front of its vehicle interior. In the following description, an arrow F direction, an arrow L direction, and an arrow U direction in the figures represent a frontward direction in the vehicle front-rear direction, a leftward direction in the vehicle width direction, and an upward direction in the vehicle up-down direction, respectively. The vehicle V has a generally symmetric structure; accordingly, the following description mainly refers to components and portions on the right side of the vehicle V unless specifically noted.

First, a description will be given of an overall configuration, according to some embodiments.

As shown in FIG. 1, the vehicle V may include: a pair of left and right side sills 1 disposed at vehicle-width-direction outer side portions and extending in the front-rear direction; a floor panel 2 laid between the pair of side sills 1 and constituting a vehicle interior floor; a pair of left and right roof side rails 10 extending in the front-rear direction and supporting a roof panel (not shown in the figure); and a pair of left and right A pillars 4, a pair of left and right B pillars 5 (pillar), a pair of left and right C pillars 6, and a pair of left and right D pillars 7 each extending downward from the pair of roof side rails 10 to the pair of side sills 1.

The side sill 1 may be composed of an outer member and an inner member formed by pressing a steel plate. These outer and inner members jointly define a substantially linear closed cross-section extending in the front-rear direction. A lower end of a hinge pillar, which corresponds to a lower half of the A pillar 4, may be connected to a front end portion of the side sill 1, and a lower end of the B pillar 5 may be connected to an intermediate portion of the side sill 1. The A pillar 4, a front portion of the roof side rail 10, the B pillar 5, and a front portion of the side sill 1 may define a door opening edge of a front door (not shown).

A front end portion of a rear wheel well 8 may be connected to a rear end portion of the side sill 1. The B pillar 5, a rear portion of the roof side rail 10, the C pillar 6, a front portion of the rear wheel well 8, and a rear portion of the side sill 1 may define a door opening edge of a rear door (not shown). The B pillar 5 may be structured such that the bending rigidity of its upper portion, corresponding to about two thirds of the length of the B pillar 5 from the upper end of the B pillar 5, may be larger than the bending rigidity of its lower portion, corresponding to about one third of the length of the B pillar 5 from the lower end of the B pillar 5.

The pair of roof side rails 10 may be disposed at the vehicle-width-direction outer side portions so as to respectively correspond to left and right ends of the roof panel. The pair of roof side rails 10 include a pair of front and rear headers 21, 22, and two roof reinforcements 23, 30. The front header 21 may connect front ends of the pair of roof side rails 10, and the rear header 22 may connect rear ends of the pair of roof side rails 10. The rear header 22 may be mounted with a pair of left and right hinges (not shown) for opening and closing a lift gate (not shown). The roof reinforcement 23 may be positioned so as to connect upper end portions of the pair of C pillars 6 in the left-right direction. The roof reinforcement 30 may be positioned so as to connect upper end portions of the pair of B pillars 5 in the left-right direction.

Figure 2:
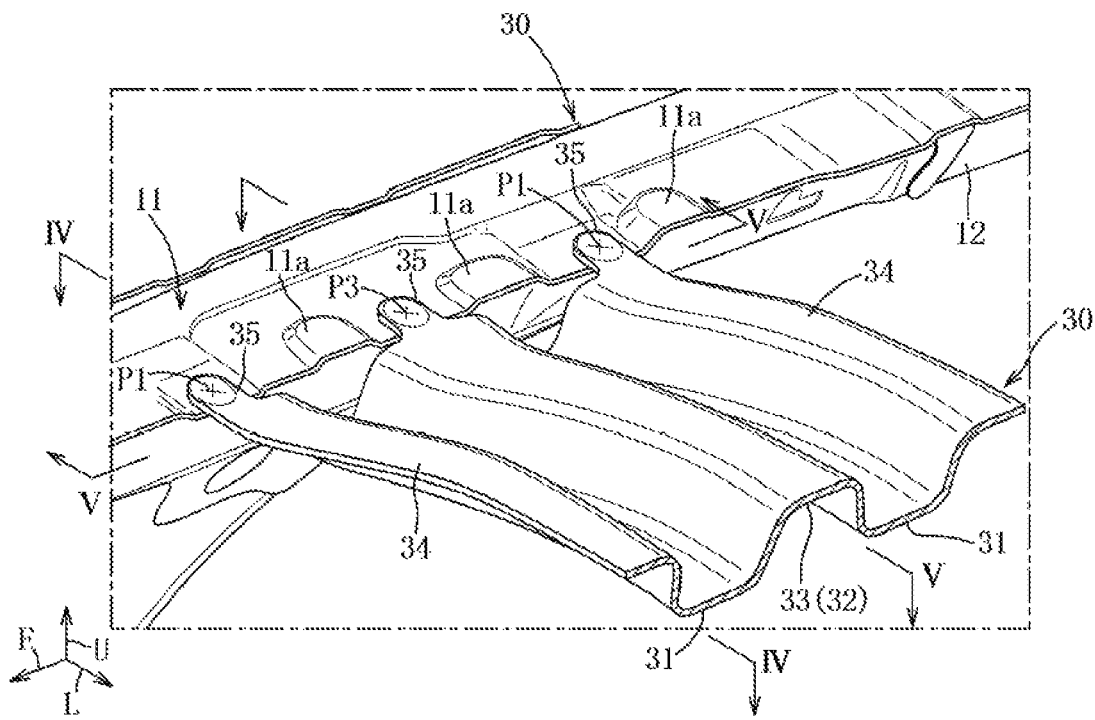
FIG. 2 is a perspective view of major parts of a roof side rail, according to some embodiments.

As shown in FIG. 2, a left end (vehicle-width-direction inner side end) of a roof rail outer 11 may be formed in a concave-convex shape (curved wave shape) in side view. The roof rail outer 11 may be formed at its end with multiple bulges 11a arranged in the front-rear direction. The bulges 11a may bulge upward relative to a reference surface that occupies most of the upper wall of the roof rail outer 11. These bulges 11a may be joined by welding to a bottom face of the roof panel. The roof reinforcement 30 may be joined to the left end of the roof rail outer 11.

Next, a description will be given of the roof reinforcement 30, according to some embodiments.

As shown in FIGS. 2 to 5, the roof reinforcement 30 may be, for example, integrally formed of a high tensile steel plate and may include: a pair of substantially U-sectioned, front and rear lower grooves 31; a connecting portion 33 connecting a rear upper end of the front lower groove 31 and a front upper end of the rear lower groove 31 to define an inverted U-sectioned upper groove 32; and a pair of front and rear flanges 34 respectively extending frontward from a front upper end of the front lower groove 31 and extending rearward from a rear upper end of the rear lower groove 31.

In some embodiments, a right end of the roof reinforcement 30, and more specifically, the right ends of the connecting portion 33 and the pair of front and rear flanges 34 may be disposed so as to face the left edge of the roof rail outer 11 with a slight gap in between. The connecting portion 33 and the pair of front and rear flanges 34 may be formed with protrusions 35 extended rightward from their respective ends. Each protrusion 35 may be positioned between two adjacent bulges 11a and joined by welding to the upper surface (reference surface) of the roof rail outer 11. A gusset 40 (shown in FIGS. 4 and 5) may be attached to provide reinforcement between the roof side rail 10 and the roof reinforcement 30 from the vehicle interior side. In response to a load being input to the roof side rail 10 via the B pillar 5 in the event of a side collision, the roof reinforcement 30 may restrain the roof side rail 10 from being displaced toward the vehicle-width-direction inner side.

Next, a description will be given of the roof side rail 10, according to some embodiments.

Figure 3:
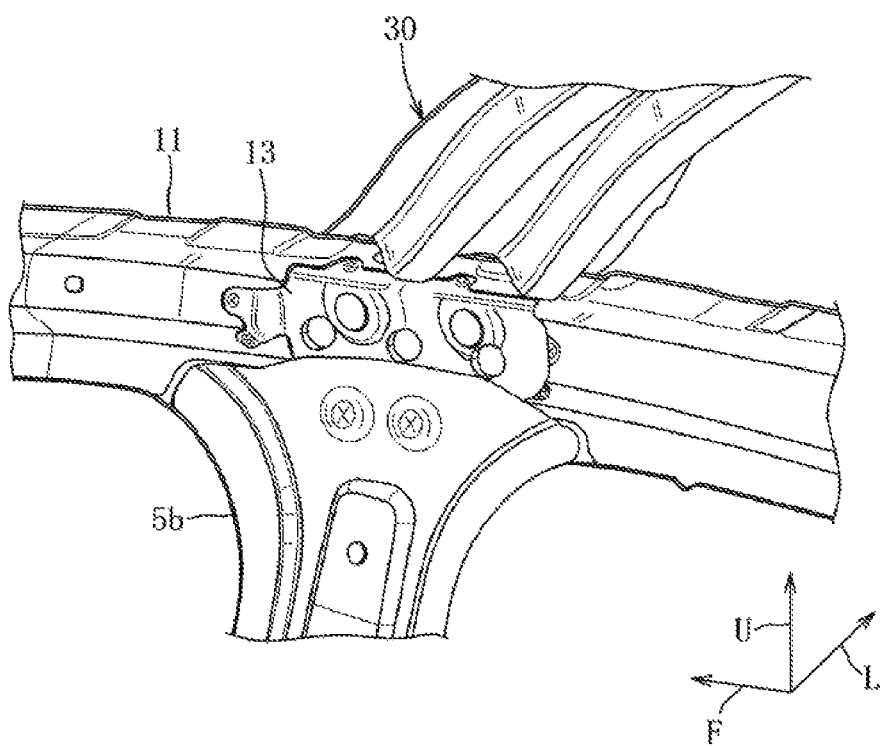
FIG. 3 is a perspective view of major parts inside the roof side rail as viewed from a vehicle interior side, according to some embodiments.
Figure 4:
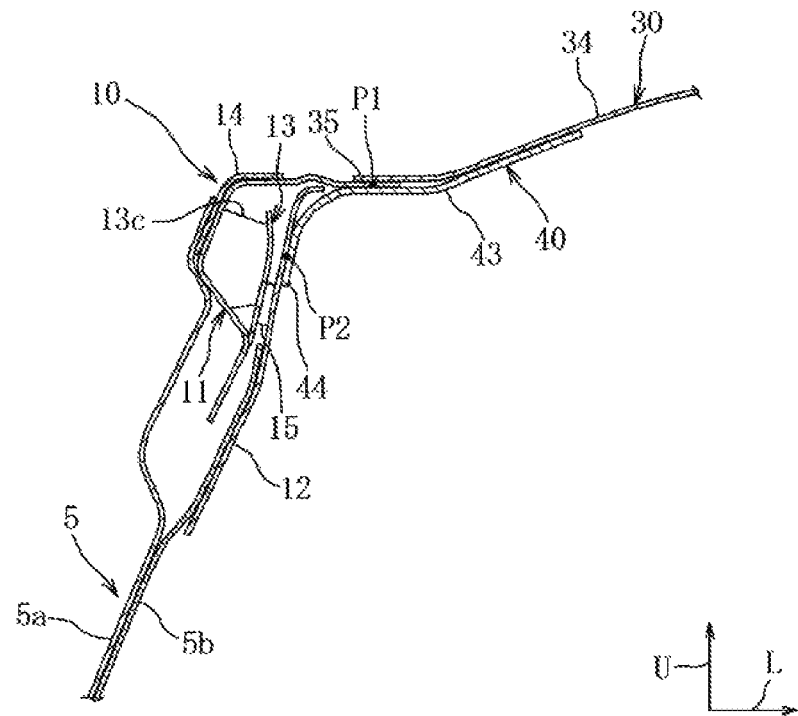
FIG. 4 is a sectional view taken along the line IV-IV of FIG. 2, according to some embodiments.
Figure 5:
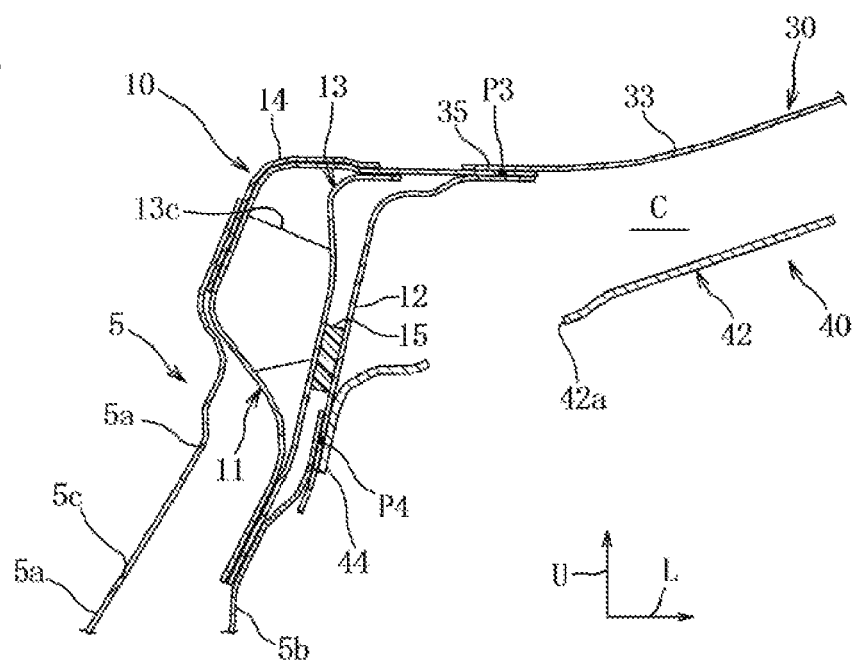
FIG. 5 is a sectional view taken along the line V-V of FIG. 2, according to some embodiments.

As shown in FIGS. 2 to 5, the roof side rail 10 may include: the roof rail outer 11 constituting a right wall (vehicle-width-direction outer side wall); a roof rail inner 12 defining, jointly with the roof rail outer 11, forming, in some embodiments, a substantially trapezoidal closed cross-section extending in the front-rear direction (see FIG. 4); and a substantially L-sectioned reinforcement member 14 covering an upper ridge of the roof rail outer 11 extending in the front-rear direction. As shown in FIGS. 3 to 5, a roof rail reinforcement 13 may be disposed at an intermediate portion in the vehicle front-rear direction of the roof side rail 10 to which the upper end of the B pillar 5 is connected. The roof rail reinforcement 13 may partition the trapezoidal closed cross-section into inside and outside portions in the vehicle width direction.

In some embodiments, an upper end of an outer member 5a (pillar outer) of the B pillar 5 may be joined to a right side of the roof rail outer 11 on which the reinforcement member 14 is disposed. An upper end portion of an inner member 5b (pillar inner) of the B pillar 5 may be joined and fixed to a lower end portion of the roof rail outer 11 with a lower end of the roof rail reinforcement 13 interposed in between. The outer member 5a may be formed with an opening 5c at a position corresponding to this joining portion. The roof rail outer 11, the roof rail reinforcement 13, and the inner member 5b may be joined through the opening 5c. Forming the opening 5c may also reduce weight.

Referring now to FIGS. 4 and 5, in some embodiments, the upper end of the inner member 5b may also be joined to a lower end of the roof rail inner 12, and an upper end of the roof rail inner 12 bent toward the vehicle-width-direction inner side may be joined to the upper face of the roof rail outer 11. On the vehicle-width-direction outer side relative to this joining portion of the roof rail inner 12 and the roof rail outer 11, an upper end of the roof rail reinforcement 13 bent toward the vehicle-width-direction inner side may be joined and fixed to the upper face of the roof rail outer 11. That is, at the intermediate portion in the vehicle front-rear direction of the roof side rail 10, the roof rail outer 11 and the roof rail reinforcement 13 may jointly define a closed cross-section extending in the front-rear direction, and the roof rail outer 11, the roof rail reinforcement 13, the inner member 5b, and the roof rail inner 12 may jointly define a closed cross-section extending in the front-rear direction. The roof rail reinforcement 13 may be fixed to the roof rail inner 12 with a resilient bonding member 15.

As shown in FIGS. 4 and 5, the roof side rail 10, the roof reinforcement 30, and the gusset 40 may be joined to each other at the first to the fourth joining portions P1 to P4. The first and the second joining portions P1 and P2 are at positions corresponding to front and rear ends of the gusset 40. At the first joining portion P1, the roof rail outer 11 may be interposed between the protrusion 35 (the flange 34) and an upper flange 43, and they may be triple-joined to each other by welding. At the second joining portion P2, which is on the vehicle-width-direction outer side relative to the first joining portion P1, the roof rail inner 12 and a side flange 44 may be joined to each other by welding.

The third and the fourth joining portions P3 and P4 are at positions corresponding to intermediate portions of the gusset 40 in the front-rear direction. The roof rail inner 12 may be partially extended leftward. Thus, at the third joining portion P3, the roof rail outer 11 is interposed between the protrusion 35 (the connecting portion 33) and the roof rail inner 12, and they may be triple-joined to each other by welding. At the fourth joining portion P4, which is on the vehicle-width-direction outer side relative to the third joining portion P3, the roof rail inner 12 is interposed between the side flange 44 and the inner member 5b, and they may be triple-joined to each other by welding.

In the present embodiment, the same joining method may be used to join the members at the first, second and fourth joining portions P1, P2, and P4. Further, the joining method to join the roof rail outer 11, the roof rail inner 12, and the roof reinforcement 30 at the third joining portion P3 may be the same as the joining method to join the members at the first, second and fourth joining portions P1, P2, and P4. This allows the welding to be done using the same welding station, helping to improve production efficiency.

Next, a description will be given of the roof rail reinforcement 13, according to some embodiments.

Figure 6:
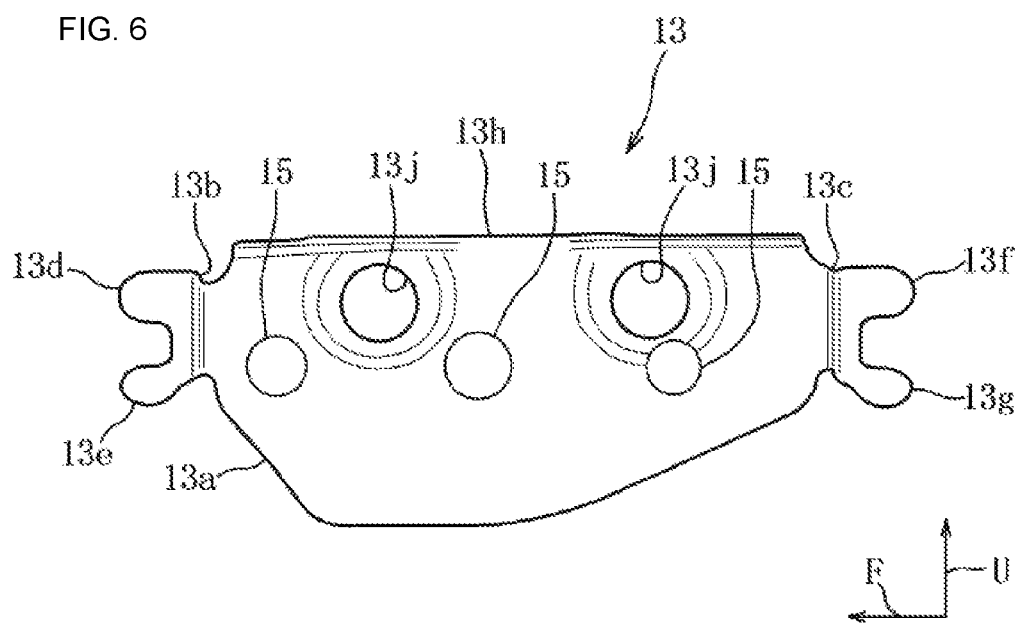
FIG. 6 is a side view of a roof rail reinforcement as viewed from the vehicle interior side, according to some embodiments.
Figure 7:
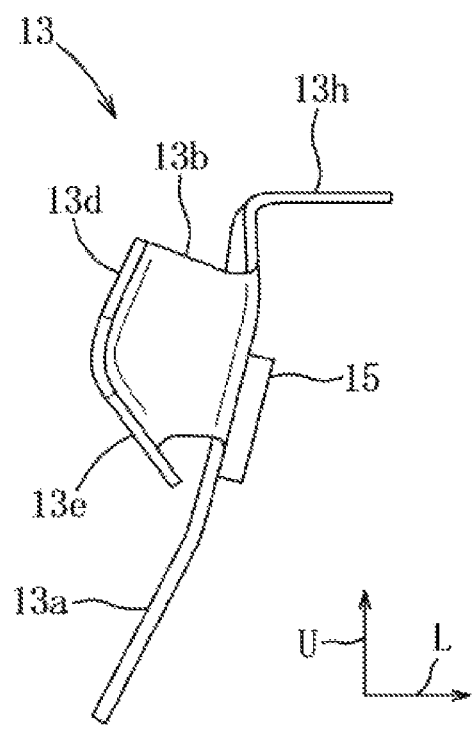
FIG. 7 is a front view of the roof rail reinforcement as viewed from the front of the vehicle, according to some embodiments.
Figure 8:
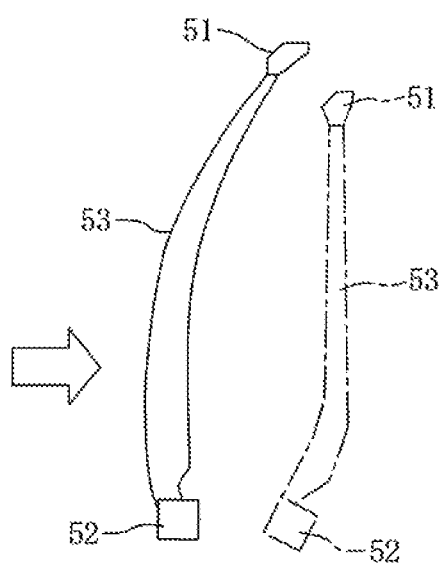
FIG. 8 explains displacement of a center pillar in the event of a side collision of the vehicle, according to some embodiments.

As shown in FIGS. 6 and 7, in some embodiments the roof rail reinforcement 13 may be formed by pressing a steel plate and may include: a plate-like body 13a; joints 13b, 13c respectively formed by bending front and rear ends of the body 13a toward the vehicle-width-direction outer side; joint joining portions 13d to 13g provided to the joints 13b, 13c for their joining to the roof rail outer 11; and an upper end joining portion 13h formed by bending an upper end of the body 13a toward the vehicle-width-direction inner side.

In some embodiments, a lower portion of the body 13a reduces its width in the front-rear direction toward the lower end. This may reduce weight and also may allow the body 13a to fit within the B pillar 5. An opening 13j formed in an upper portion of the body 13a may enable spot welding of the outer member 5a of the B pillar 5 and the roof rail outer 11 through the opening 13j and also contributes to reduced weight. The bonding members 15 for fixing the roof rail reinforcement 13 to the roof rail inner 12 may be attached respectively to middle front and middle rear portions and an intermediate portion of the body 13a.

In some embodiments, the roof rail reinforcement 13 may partition the trapezoidal closed cross-section of the roof side rail 10 into inner and outer sides in the vehicle width direction, and the closed cross-section on the vehicle-width-direction outer side may also be partitioned on front and rear sides by the joints 13b, 13c of the roof rail reinforcement 13. These joints 13b, 13c may function to prevent collapse of the closed cross-section of the roof side rail 10 on the vehicle-width-direction outer side and increase its rigidity, restraining deformation of the roof side rail 10 in the event of a side collision to thereby reduce entry of the B pillar 5 into the vehicle interior. Additionally, the roof rail reinforcement 13 may be fixed to the roof rail inner 12, which may allow the roof rail reinforcement 13 to also prevent collapse of the closed cross-section of the roof side rail 10 on the vehicle-width-direction inner side. This allows to further restrain deformation of the roof side rail 10 in the event of a side collision.

The joints 13b, 13c of the roof rail reinforcement 13 may produce differences in rigidity against sectional collapse between portions of the closed cross-section partitioned into inner and outer sides in the vehicle width direction, and in response to vibrations transmitted from the B pillar 5, the roof rail inner 12 may vibrate relatively more than the roof rail reinforcement 13. These vibrations may be damped by the bonding members 15 absorbing and converting them into heat, whereby vibrations transmitted to the roof reinforcement 30 and other components may be reduced. In other words, the bonding members 15 may function to damp vibrations transmitted to the roof side rail 10 via the B pillar 5.

Next, functions and effects of the above described upper vehicle-body structure will be described, according to some embodiments.

The upper vehicle-body structure includes the roof rail reinforcement 13 disposed inside the roof side rail 10, which has a closed cross-section extending in the front-rear direction, at the intermediate portion of the roof side rail 10 in the vehicle front-rear direction where the B pillar 5 is connected to the roof side rail 10. The roof rail reinforcement 13 may partition the space inside the roof side rail 10 into inner and outer portions in the vehicle width direction and also may partition the outer space in a joint-like manner at two points in the front-rear direction. The roof rail reinforcement 13 is at least fixed to the roof rail outer 11 and the roof rail inner 12 constituting the roof side rail 10 and to the inner member 5b constituting the B pillar 5. Thus, in the event of a side collision, the roof rail reinforcement 13 fixed to both of the roof side rail 10 and the B pillar 5 may restrain displacement of the B pillar 5 relative to the roof side rail 10 and may also restrain sectional deformation of the roof side rail 10 to thereby reduce deformation of the roof side rail 10. This may restrain the B pillar 5 from moving (entering) into the vehicle interior.

The lower portion of the roof rail reinforcement 13 may be shaped such that its width in the front-rear direction narrows downward to conform to the shape of the B pillar 5. This may reduce weight of the roof rail reinforcement 13 and thus restrain an increase in body weight resulting from enhancing the rigidity of the upper vehicle-body structure.

The outer member 5a may include the opening 5c at the portion corresponding to the lower end of the roof rail reinforcement 13. This may allow for joining through the opening 5c, enabling an easy assembly and reduced the weight of the vehicle body.

Besides the above, those skilled in the art will readily understand that various modifications to the above embodiment are possible while keeping with the essential teaching of the present invention. The present invention encompasses these modifications and alterations.

DESCRIPTION OF SYMBOLS

5 B pillar (pillar)
5a Outer member (pillar outer)
5b Inner member (pillar inner)
5c Opening
10 Roof side rail
11 Roof rail outer 12 Roof rail inner
13 Roof rail reinforcement
13a Body
13b, 13c Joint
13d-13g Joint joining portion
13h Upper end joining portion
14 Reinforcement member
15 Bonding member
23, 30 Roof reinforcement
40 Gusset
V Vehicle

The invention claimed is:

1. An upper vehicle-body structure of a vehicle, the upper vehicle-body structure comprising:
a roof side rail disposed at an upper and vehicle-width-direction outer side portion of the vehicle, the roof side rail including a closed cross-section extending in a vehicle front-rear direction;
a pillar extending downward from an intermediate portion in the vehicle front-rear direction of the roof side rail; and
a roof rail reinforcement disposed inside the roof side rail at the intermediate portion in the vehicle front-rear direction of the roof side rail and extending in the vehicle front-rear direction, the roof rail reinforcement including front and rear ends bent toward a vehicle-width-direction outer side, the roof rail reinforcement being configured to partition a space inside the intermediate portion of the roof side rail in the vehicle front-rear direction and a vehicle width direction, the upper vehicle-body structure being characterized in that:
the roof side rail includes a roof rail outer and a roof rail inner, the roof rail outer constituting a vehicle-width-direction outer side wall, the roof rail inner defining, jointly with the roof rail outer, a closed cross-section,
the pillar includes a pillar outer and a pillar inner, the pillar outer constituting a vehicle-width-direction outer side wall, the pillar inner defining, jointly with the pillar outer, a closed cross-section extending in an up-down direction, and
the roof rail reinforcement is at least fixed directly to the roof rail outer, the roof rail inner, and the pillar inner.

2. The upper vehicle-body structure according to claim 1, wherein a lower end of the roof rail reinforcement is shaped such that a width in the front-rear direction of the lower end narrows downward to conform to a shape of the pillar.

3. The upper vehicle-body structure according to claim 1, wherein the pillar outer includes an opening at a portion corresponding to a lower end of the roof rail reinforcement.

4. The upper vehicle-body structure according to claim 1, wherein the roof rail reinforcement is formed by pressing a steel plate.

5. The upper vehicle-body structure according to claim 1, wherein the roof rail reinforcement is fixed to the roof rail inner by one or more resilient bonding members.

6. The upper vehicle-body structure according to claim 1, wherein the roof rail reinforcement includes:
a plate-like body;
a plurality of joints formed by bending front and rear ends of the plate-like body toward the vehicle-width-direction outer side;
a plurality of joint joining portions provided to the plurality of joints for their joining to the roof rail outer; and
an upper end joining portion formed by bending an upper end of the plate-like body toward the vehicle-width-direction inner side.

7. A vehicle, comprising:
a body having a roof side rail disposed at an upper and vehicle-width-direction outer side portion of the vehicle, the roof side rail including a closed cross-section extending in a vehicle front-rear direction;
a pillar extending downward from an intermediate portion in the vehicle front-rear direction of the roof side rail; and
a roof rail reinforcement disposed inside the roof side rail at the intermediate portion in the vehicle front-rear direction of the roof side rail and extending in the vehicle front-rear direction, the roof rail reinforcement including front and rear ends bent toward a vehicle-width-direction outer side, the roof rail reinforcement being configured to partition a space inside the intermediate portion of the roof side rail in the vehicle front-rear direction and a vehicle width direction, the upper vehicle-body structure being characterized in that:
the roof side rail includes a roof rail outer and a roof rail inner, the roof rail outer constituting a vehicle-width-direction outer side wall, the roof rail inner defining, jointly with the roof rail outer, a closed cross-section,
the pillar includes a pillar outer and a pillar inner, the pillar outer constituting a vehicle-width-direction outer side wall, the pillar inner defining, jointly with the pillar outer, a closed cross-section extending in an up-down direction, and
the roof rail reinforcement is at least fixed directly to the roof rail outer, the roof rail inner, and the pillar inner.

8. The vehicle of claim 7, wherein a lower end of the roof rail reinforcement is shaped such that a width in the front-rear direction of the lower end narrows downward to confirm to a shape of the pillar.

9. The vehicle of claim 7, wherein the pillar outer includes an opening at a portion corresponding to a lower end of the roof rail reinforcement.

10. The vehicle of claim 7, wherein the roof rail reinforcement is formed by pressing a steel plate.

11. The vehicle of claim 7, wherein the roof rail reinforcement is fixed to the roof rail inner by one or more resilient bonding members.

12. The vehicle of claim 7, wherein the roof rail reinforcement includes:
a plate-like body;
a plurality of joints formed by bending front and rear ends of the plate-like body toward the vehicle-width-direction outer side;
a plurality of joint joining portions provided to the plurality of joints for their joining to the roof rail outer; and
an upper end joining portion formed by bending an upper end of the plate-like body toward the vehicle-width-direction inner side.

13. A roof side rail of a vehicle disposed at an upper and vehicle-width-direction outer side portion of the vehicle; comprising:
a roof rail outer and a roof rail inner, the roof rail outer constituting a vehicle-width-direction outer side wall, the roof rail inner defining, jointly with the roof rail outer, a closed cross-section in a vehicle front-rear direction;
a connection point at an intermediate portion in the vehicle front-rear direction of the roof side rail for attachment of a pillar, the pillar extending downward from the roof side rail; and a roof rail reinforcement disposed inside the roof side rail at the intermediate portion in the vehicle front-rear direction of the roof side rail and extending in the vehicle front-rear direction, the roof rail reinforcement including front and rear ends bent toward a vehicle-width-direction outer side, the roof rail reinforcement being configured to partition a space inside the intermediate portion of the roof side rail in the vehicle front-rear direction and a vehicle width direction, wherein the roof rail reinforcement is at least fixed directly to the roof rail outer, the roof rail inner, and the pillar.

14. The roof side rail of a vehicle of claim 13, wherein a lower end of the roof rail reinforcement is shaped such that a width in the front-rear direction of the lower end narrows downward to conform to a shape of the pillar.

15. The roof side rail of a vehicle of claim 13, wherein the pillar includes an opening at a portion corresponding to a lower end of the roof rail reinforcement.

16. The roof side rail of a vehicle of claim 13, wherein the roof rail reinforcement is formed by pressing a steel plate.

17. The roof side rail of a vehicle of claim 13, wherein the roof rail reinforcement is fixed to the roof rail inner by one or more resilient bonding members.

18. The upper vehicle-body structure according to claim 1, wherein the roof side rail includes a substantially L-sectioned reinforcement structure covering an upper ridge of the roof rail outer extending in the vehicle front-rear direction.

19. The upper vehicle-body structure according to claim 1, wherein an upper end portion of the pillar inner is joined and fixed to a lower end portion of the roof rail outer with a lower end of the roof rail reinforcement interposed in between, and wherein the pillar is a B pillar.

20. The upper vehicle-body structure according to claim 1, wherein an upper end of the pillar inner is joined to a lower end of the roof rail inner, and an upper end of the roof rail inner is bent toward the vehicle-width-direction inner side and is joined to an upper face of the roof rail outer.

* * * * *